United States Patent
Hommi et al.

(10) Patent No.: US 10,051,151 B2
(45) Date of Patent: Aug. 14, 2018

(54) IMAGE PROCESSING APPARATUS, NON-TRANSITORY COMPUTER READABLE STORAGE MEDIUM AND IMAGE PROCESSING METHOD

(71) Applicant: FUJI XEROX CO., LTD., Tokyo (JP)

(72) Inventors: Tetsuya Hommi, Kanagawa (JP); Satoshi Maruyama, Kanagawa (JP); Yutaka Koda, Kanagawa (JP); Yasushi Ujigawa, Kanagawa (JP); Yohei Makino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/430,999

(22) Filed: Feb. 13, 2017

(65) Prior Publication Data

US 2018/0063369 A1    Mar. 1, 2018

(30) Foreign Application Priority Data

Aug. 25, 2016 (JP) ................ 2016-165091

(51) Int. Cl.
*H04N 1/393*    (2006.01)
*H04N 1/00*    (2006.01)

(52) U.S. Cl.
CPC ......... *H04N 1/393* (2013.01); *H04N 1/00408* (2013.01); *H04N 2201/0082* (2013.01)

(58) Field of Classification Search
USPC ........................................... 358/1.2
See application file for complete search history.

(56) References Cited

U.S. PATENT DOCUMENTS

| | | | |
|---|---|---|---|
| 2004/0146199 A1* | 7/2004 | Berkner | G06F 17/30905 382/176 |
| 2004/0205628 A1* | 10/2004 | Rosenholtz | G06F 3/0481 715/229 |
| 2009/0185224 A1* | 7/2009 | Akahane | G06K 15/005 358/1.16 |

FOREIGN PATENT DOCUMENTS

| | | |
|---|---|---|
| JP | 2009-044283 A | 2/2009 |
| JP | 2010-214785 A | 9/2010 |

* cited by examiner

*Primary Examiner* — Ngon Nguyen
(74) *Attorney, Agent, or Firm* — Oliff PLC (57) ABSTRACT

An image processing apparatus includes a generating unit and a display. The generating unit performs a reduction process on at least a part of document data to generate a reduced image. The display displays the reduced image.

9 Claims, 9 Drawing Sheets

IMAGE PROCESSING APPARATUS, NON-TRANSITORY COMPUTER READABLE STORAGE MEDIUM AND IMAGE PROCESSING METHOD

CROSS-REFERENCE TO RELATED APPLICATIONS

This application is based on and claims priority under 35 USC 119 from Japanese Patent Application No. 2016-165091 filed Aug. 25, 2016.

BACKGROUND

Technical Field

The present invention relates to an image processing apparatus, a non-transitory computer readable storage medium and an image processing method.

SUMMARY

According to an aspect of the invention, an image processing apparatus includes a generating unit and a display. The generating unit performs a reduction process on at least a part of document data to generate a reduced image. The display displays the reduced image.

BRIEF DESCRIPTION OF THE DRAWINGS

Exemplary embodiments of the present invention will be described in detail based on the following figures, wherein:

FIGS. 3A to 3C are explanatory views illustrating specific examples of the first exemplary embodiment, in which

FIGS. 5A and 5B are explanatory views illustrating specific examples of the second exemplary embodiment, in which

FIGS. 7A to 7D are explanatory views illustrating specific examples of the third exemplary embodiment, in which

FIGS. 9A and 9B are explanatory views illustrating specific examples of the fourth exemplary embodiment, in which

DETAILED DESCRIPTION

First Exemplary Embodiment

Figure 1:
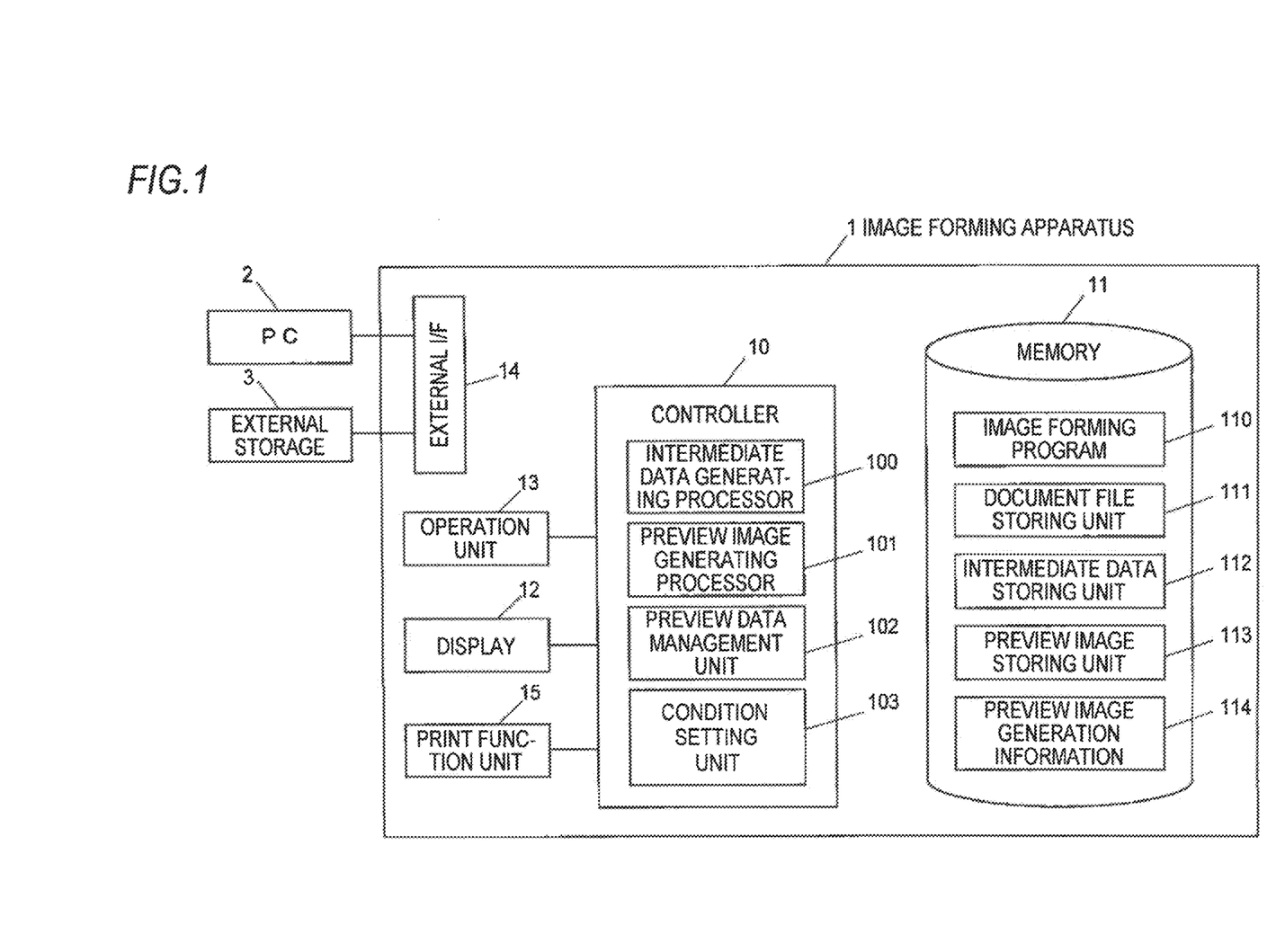
FIG. 1 is a block diagram schematically illustrating an image forming apparatus according to a first exemplary embodiment of the present invention.

FIG. 1 is a block diagram schematically illustrating an image forming apparatus as an image processing apparatus according to a first exemplary embodiment of the present invention.

As illustrated in FIG. 1, an image forming apparatus 1 includes a controller 10, a memory 11, a display 12, an operation unit 13, an external interface (external I/F) 14, a print function unit 15 and the like. The controller 10 is configured with a CPU or the like, and controls respective units and executes various programs. The memory 11 is configured with a recording medium such as, a hard disk, a flash memory or the like, and stores information. A personal computer (PC) 2 or an external storage 3 is connected as an external terminal to the image forming apparatus 1 via the external I/F 14.

The image forming apparatus 1 according to the present exemplary embodiment includes the print function unit 15 as described above. A user selects document data acquired from an external terminal device such as the personal computer 2 or the external I/F 14, or document data accumulated in the memory 11 of the image forming apparatus 1 by operating the operation unit 13 of the image forming apparatus 1, and issues a printing instruction to start printing.

Here, when there are plural document files as printing targets, for example, a reduced image (hereinafter, referred to as a "preview image") obtained by reducing document data of a first page of each of the document files is displayed on the display 12. The user views the preview image and selects a document file to be printed. Accordingly, in order to quickly perform printing, it is necessary to quickly display a preview image used for selecting a document file.

However, if the performance of the image forming apparatus is low, it takes time to perform a process of generating a preview image due to, for example, a small capacity of a memory, limited hardware resources, or a low processing capability of the CPU, or a displayed preview image may be small and difficult to see due to a small display screen size of the display 12. Also, if a preview image of data includes many texts and the display screen is small, characters would be displayed in a collapsed state. Thus, even when the preview image is correctly drawn, the characters are illegible.

Therefore, in the first exemplary embodiment, if a size of a character in document data is smaller than a predetermined threshold value, a reduction process of reducing the character and generating a preview image (also, referred to as a character drawing process) is omitted, and the character is replaced with predetermined fixed data. Accordingly, the reduction process is performed on a part of the document data, thereby speeding up the process of generating the preview image, and thus quickly displaying the preview image.

The document data is accumulated in the memory 11 of the image forming apparatus 1, but may be acquired from the personal computer 2 or acquired from data stored in the external storage 3 such as a USB. Alternatively, if the image forming apparatus 1 has a scanner function, the data may be read by a scanner and accumulated in the memory 11.

The memory 11 of the image forming apparatus 1 stores an image forming program 110, a document file storing unit 111, an intermediate data storing unit 112, a preview image storing unit 113, preview image generation information 114, and the like.

In the document file storing unit 111, document files acquired by the image forming apparatus 1 are accumulated. In the intermediate data storing unit 112, intermediate data generated from document data are accumulated. In the preview image storing unit 113, preview images generated from the intermediate data are accumulated. In the preview image generation information 114, various conditions (including conditions of a process of generating a preview image) previously set by a condition setting unit 103 are stored.

The controller 10 serves as an intermediate data generating processor 100, a preview image generating processor 101, a preview data management unit 102, the condition setting unit 103, and the like by executing the image forming program 110, as an image processing program, stored in the memory 11.

The intermediate data generating processor 100 generates intermediate data used for drawing from document data.

The preview image generating processor 101 generates a preview image reduced to a predetermined size from the intermediate data. The generated preview image is displayed on the display 12. That is, the preview image generating processor 101 is an example of a generating unit that generates a reduced image. The display 12 is an example of a display that displays the reduced image.

Here, since the user selects a document file to be printed while viewing the preview image displayed on the display 12, the preview image generating processor 101 generates the preview image from the intermediate data of a first page of each document file so that the document file is easily selected.

The preview data management unit 102 manages preview data by, for example, storing the generated preview image in the preview image storing unit 113, or displaying the preview image on the display 12.

The condition setting unit 103 sets conditions for performing a reduction process on at least a part of the intermediate data generated from the document data when the preview image is generated.

In the first exemplary embodiment, if document data includes a character, a reduction process is performed when a font size of the character is equal to or larger than a predetermined threshold value. Then, when the font size of the character is smaller than the predetermined threshold value, the reduction process is not performed on the character and the character is replaced with fixed data.

Accordingly, in the first exemplary embodiment, the condition setting unit 103 sets, in advance, (i) a threshold value that is a criteria used for determining whether to perform the reduction process on a character and (ii) the fixed data that is replaced with a character when the size of the character is smaller than the threshold value.

In FIG. 1, the display 12 and the operation unit 13 are individually connected to the controller 10, but may be configured as a user interface (UI) serving as an operation display in which a display panel and an operation panel are integrated.

Operation of First Exemplary Embodiment

Figure 2:
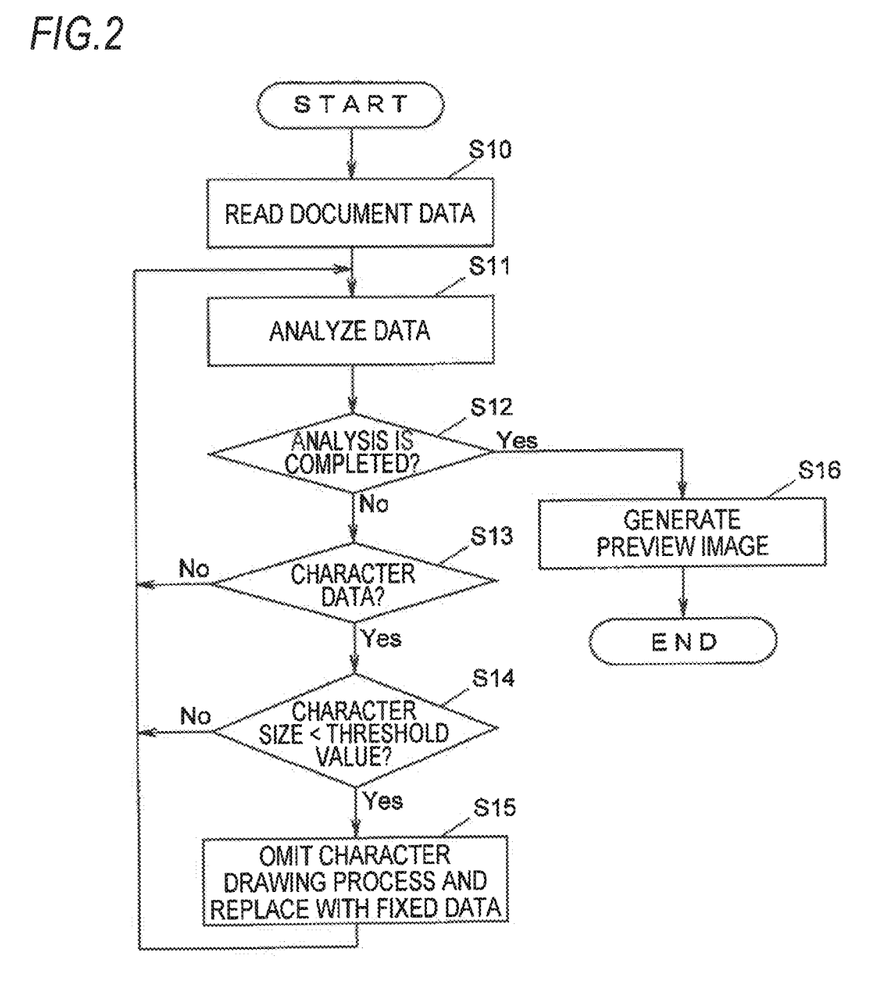
FIG. 2 is a flow chart illustrating an example of an operation according to the first exemplary embodiment.

FIG. 2 is a flow chart illustrating an example of an operation according to the first exemplary embodiment. In particular, the flow chart of FIG. 2 illustrates a process of generating a preview image from each document data accumulated in the document file storing unit 111.

When a user gives an instruction to display a preview image on the display 12 by operating the operation unit 13, the controller 10 reads document data of a first page of a document file from the document file storing unit 111 of the memory 11, into a work area of the controller 10 (S10).

The intermediate data generating processor 100 analyzes the read document data (S11). Then, the intermediate data generating processor 100 generates intermediate data obtained by decomposing the document data into objects such as images or characters constituting a page of the document data. The intermediate data generating processor 100 stores the generated intermediate data in the intermediate data storing unit 112 of the memory 11.

Next, it is determined whether analysis of the first page of the document data is completed (S12). If it is determined that the analysis of the first page of the document data is not completed yet (S12; No), it is determined whether character data is included in the document data (S13).

If it is determined that the character data is not included (S13; No), the process returns to step S11 and the intermediate data generating processor 100 continues to perform the data analysis. Also, if it is determined that the character data is included (S13; Yes), the preview image generating processor 101 performs a character drawing process for generating a preview image from the intermediate data. Here, it is determined whether a character size is smaller than a predetermined threshold value (S14).

If it is determined that the character size is smaller than the threshold value (S14; Yes), the preview image generating processor 101 omits the character drawing process, and replaces the character with the predetermined fixed data (S15).

Next, the process returns again to step S11 and the intermediate data generating processor 100 continues to perform the data analysis. If it is determined that analysis of the entire first page of the document file is completed (S12; Yes), the preview image generating processor 101 generates a preview image of the document data of the first page of the document file (S16). Here, as described above, the fixed data is used for the character which is smaller in size than the threshold value.

The generated preview image is registered in the preview data management unit 102. The preview data management unit 102 displays the generated preview image on the display 12 and stores the generated preview image in the preview image storing unit 113 of the memory 11.

Figure 3A:
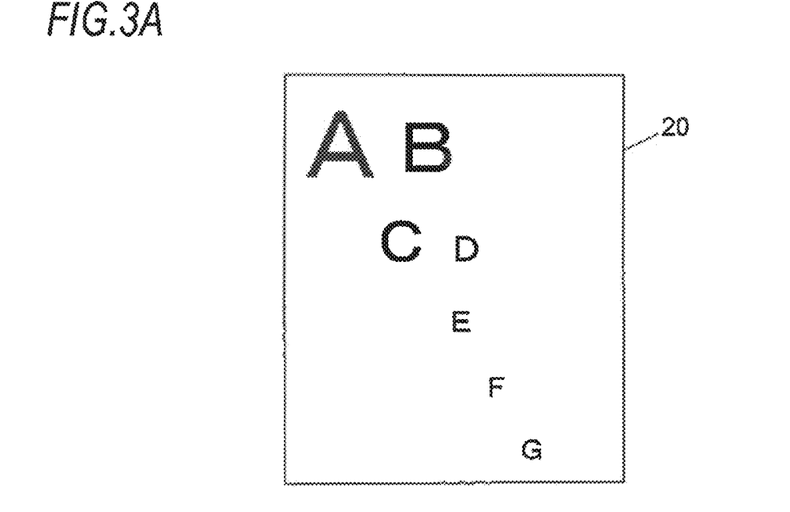
FIG. 3A illustrates document data of a first page.
Figure 3B:
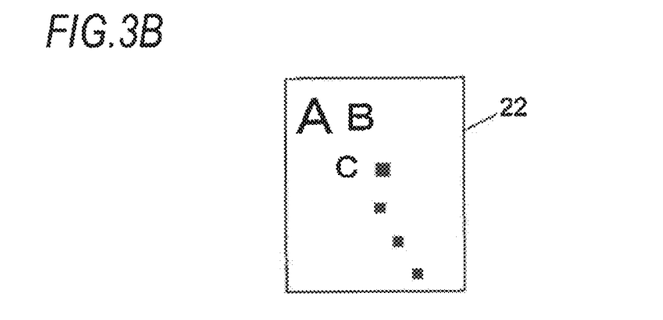
FIGS. 3B and 3C illustrate preview images.
Figure 3C:
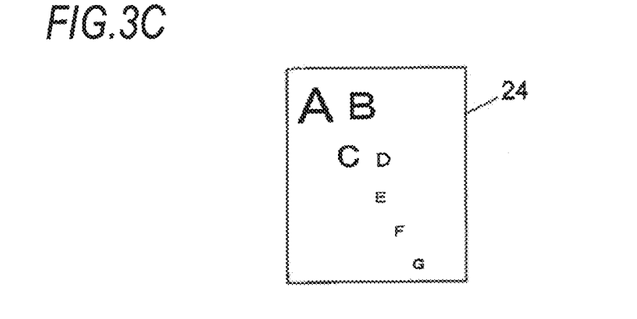

FIGS. 3A to 3C illustrate specific examples of the first exemplary embodiment. FIG. 3A illustrates document data 20 of a first page of a document file, in which characters A, B, C, D, E, F, and G are arranged while gradually decreasing in size (characters E, F, and G having the same size) FIG. 3B illustrates a preview image 22 obtained by reducing the document data 20. If reducing the document data 20 of the first page makes D, E, F, and G smaller than the threshold value, D, E, F, and G are replaced with the predetermined fixed data as illustrated in FIG. 3B. Here, a square ■ filled with black is set as fixed data. The square is a symbol indicating that a character is present in the place of the square.

As described above, the character drawing process for generating the preview image is performed on the characters A, B, and C. If the character D and subsequent characters are reduced in the same manner, the resultant characters would be too small and collapsed and be illegible. Thus, for D and subsequent characters, the character drawing process is omitted, and each character is replaced with the symbol ■ as the fixed data. The fixed data with which the character is replaced is not limited to the square symbol ■ filled with black, but may be any other symbol such as a circle symbol ● or a triangle symbol ▲ filled with black, or an asterisk *, as long as the symbol indicates that a character is present in the place of the symbol.

A method of determining the threshold value that serves as criteria to replace a character with the fixed data is not limited to one method, but various methods may be employed. There are various determination methods including a method of determining the threshold value based on (i) a character size in original document data or (ii) a size displayed as a preview image, and a method of determining the threshold value in consideration of a reduction ratio between an original character size and a character size in a preview image. Alternatively, the threshold value may be determined based on a character size which is obtained according to printing settings such as reduction, enlargement, or collective printing of plural pages into one sheet.

As described above, in the present exemplary embodiment, on a character smaller in size than a threshold value, a character drawing process for generating a preview image is omitted, and the process is performed on a part of document data to generate a preview image. Thus, the preview image may be quickly displayed.

A preview image obtained by replacing a character smaller than a threshold value with fixed data may not be clear. Also, a user may have plenty of time and want to see a detailed image. Further, after selecting document data to be printed, the user may want to see and check a detailed image. In such cases, the process may not be omitted such that all characters may be drawn to generate a preview image 24 as illustrated in FIG. 3C.

Second Exemplary Embodiment

In a second exemplary embodiment, the condition setting unit 103 presets a time during which a process of generating a preview image is to be performed, the preview image generating processor 101 terminates the process at the preset time, and the display 12 displays a preview image that is generated up to the time when the process is terminated.

Accordingly, when a preview image of document data of a first page of a document file is generated, a preview image generating process is not performed for all the data in the first page. The process of generating the preview image is terminated at a preset time, and a reduction process is performed on apart of the document data. This shortens a time taken to generate the preview image, so that the preview image is quickly displayed.

The hardware configuration of the image forming apparatus according to the second exemplary embodiment is the same as that of the first exemplary embodiment as described above, and detailed descriptions thereof will be omitted. In the second exemplary embodiment, a threshold value of time set in advance by the condition setting unit 103, based on which termination of a process is determined, is stored in the preview image generation information 114.

Figure 4:
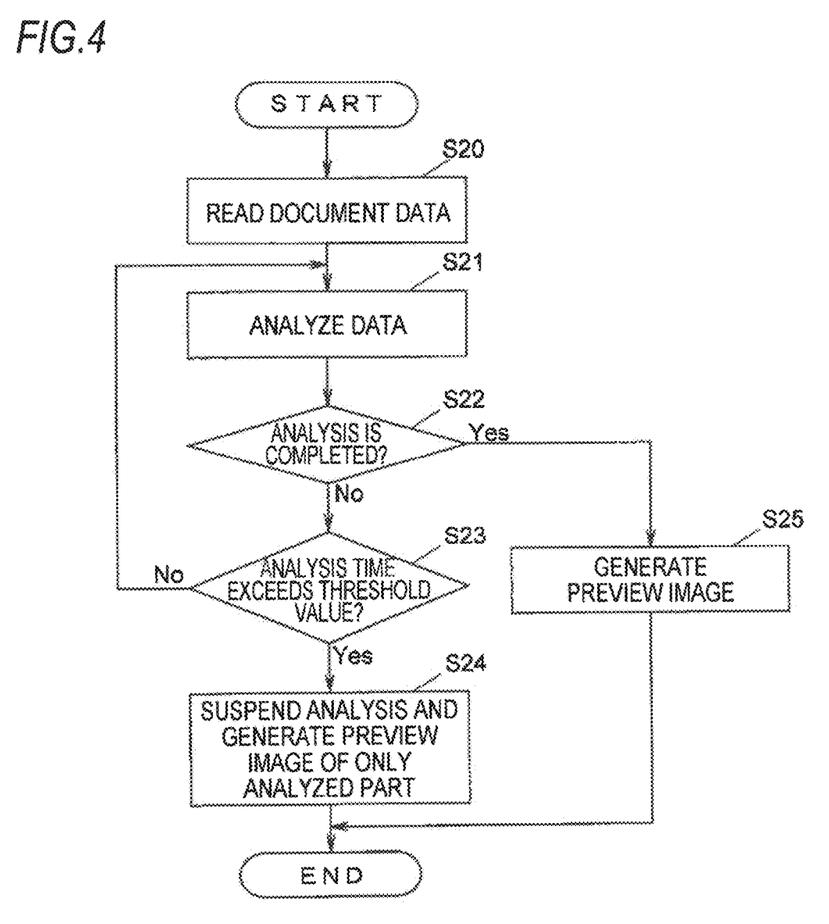
FIG. 4 is a flow chart illustrating an example of an operation according to a second exemplary embodiment.

FIG. 4 is a flow chart illustrating an example of an operation according to the second exemplary embodiment. Hereinafter, the second exemplary embodiment will be described with reference to the flow chart.

In the same manner as in the first exemplary embodiment, when a user gives an instruction to display a preview image on the display 12 by operating the operation unit 13, the controller 10 reads document data of a first page of a document file from the document file storing unit 111 of the memory 11, into a work area of the controller 10 (S20).

The intermediate data generating processor 100 analyzes the read document data (S21). Then, the intermediate data generating processor 100 generates intermediate data obtained by decomposing the document data into objects such as images or characters constituting a page of the document data. The intermediate data generating processor 100 stores the generated intermediate data in the intermediate data storing unit 112 of the memory 11.

Next, it is determined whether analysis of the first page of the document data is completed (S22). If it is determined that the analysis of the first page of the document data is not completed yet (S22; No), it is determined whether a time spent in analyzing the document data to generate a preview image exceeds a predetermined threshold value (S23). If it is determined that a time spent in analyzing the document data does not exceed the threshold value yet (S23; No), the process returns to step S21, and the intermediate data generating processor 100 continues to perform the process of analyzing the document data.

If it is determined that a time spent in analyzing the document data exceeds the threshold value (S23; Yes), the process of analyzing the document data to generate a preview image is suspended, and the preview image generating processor 101 generates a preview image of only a part on which the analyzing process is completed (S24). Here, the preview image of the first page is generated, but the process of analyzing the entire first page is not completed yet. Thus, portions other than the portions on which the analyzing process is completed are generated as blanks.

If it is determined in step S22 that the process of analyzing the first page is completed (S22; Yes), since the process on the first page is completed, the preview image generating processor 101 generates a preview image of the entire first page of the document data (S25). The preview data management unit 102 displays the generated preview image on the display 12.

Figure 5A:
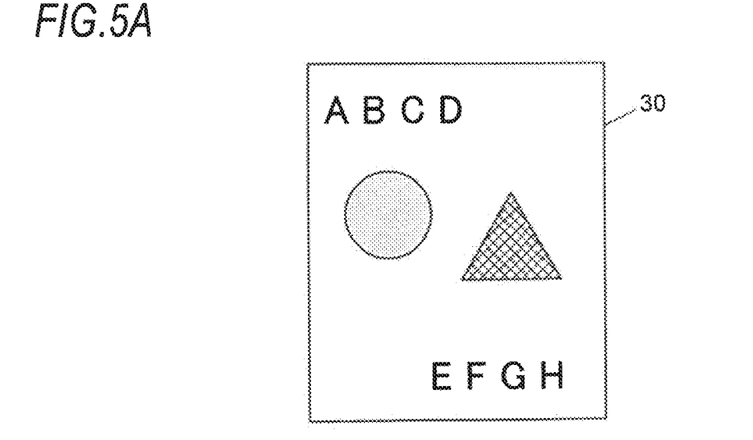
FIG. 5A illustrates document data of a first page.
Figure 5B:
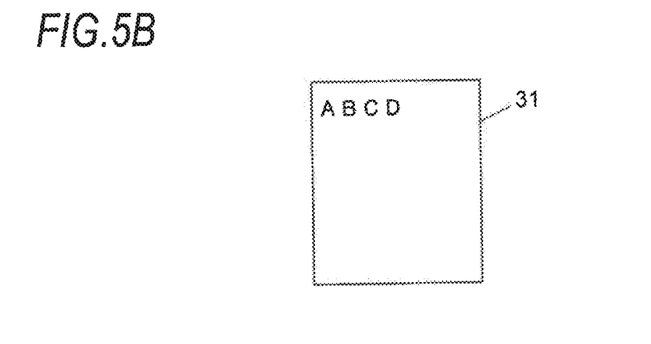
FIG. 5B illustrates a preview image.

FIGS. 5A and 5B illustrate specific examples of the second exemplary embodiment. FIG. 5A illustrates document data 30 of a first page as document data. Characters A, B, C, and D are present in the upper part of the document data 30 of the first page, circle and triangle images are present in the middle part, and characters E, F, G, and H are present in the lower part.

Now, it is assumed that a process of generating a preview image is sequentially performed from the top to the bottom of the first page. Here, when the process is suspended at a predetermined time, for example, only apart of the characters A, B, C, and D in the upper part is processed and, a preview image 31 is generated as illustrated in FIG. 5B.

As described above, in this case, the process is suspended at the predetermined time. Thus, processes for the middle part and the lower part of the first page are omitted, and the preview image may be quickly generated accordingly. In general, since a headline is arranged at the upper part of the document data, only the preview image in the upper part as illustrated in FIG. 5B is sufficient to be used for the selection of the document data.

As described above, in the second exemplary embodiment, a process of generating a preview image is suspended at a predetermined time, and only a portion that is processed up to that time is displayed as a preview. This may speed up a process of displaying a preview image.

Third Exemplary Embodiment

In a third exemplary embodiment, the preview image generating processor 101 terminates a process at a time set by the condition setting unit 103 in advance, and a preview image that is generated up to the time when the process is terminated is displayed on the display 12. Then, if a user further specifies a portion to be displayed as a preview, the preview image generating processor 101 generates the preview image of the specified portion again.

It may not be possible to select document data to be printed by using the displayed preview image even though a process of generating a preview image is suspended at a predetermined time and a portion that is processed up to that time is displayed as a preview. Even in this case, with the above configuration, a user easily selects the document data by specifying a portion to be displayed as a preview again.

The hardware configuration of the image forming apparatus according to the third exemplary embodiment is also the same as that of the second exemplary embodiment as described above, and detailed descriptions thereof will be omitted.

Figure 6:
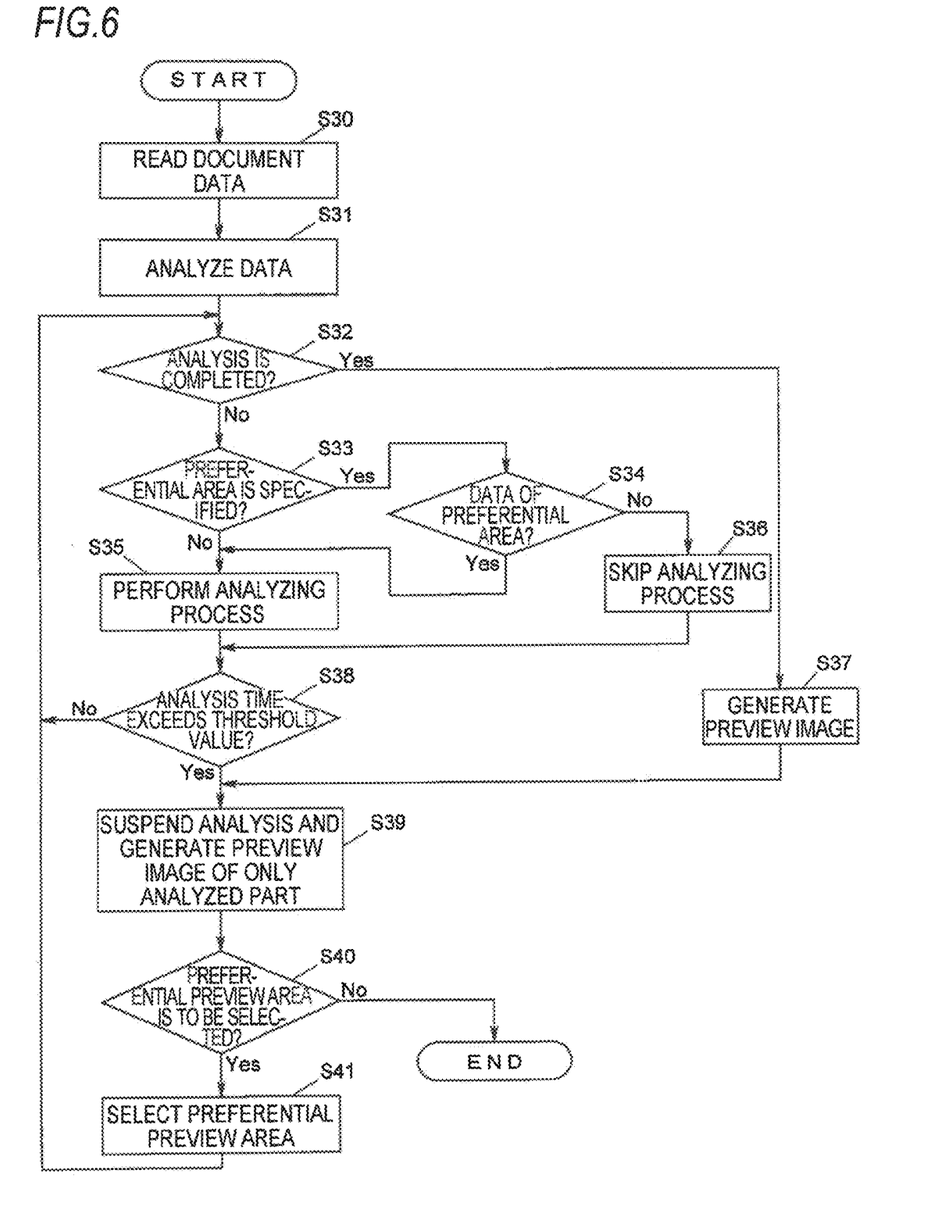
FIG. 6 is a flow chart illustrating an example of an operation according to a third exemplary embodiment.

FIG. 6 is a flow chart illustrating an example of an operation according to the third exemplary embodiment. Hereinafter, the third exemplary embodiment will be described with reference to the flow chart.

In the same manner as in the first exemplary embodiment, when a user gives an instruction to display a preview image on the display 12 by operating the operation unit 13, the controller 10 reads document data of a first page of a document file from the document file storing unit 111 of the memory 11, into a work area of the controller 10 (S30).

The intermediate data generating processor 100 analyzes the read document data (S31). Then, the intermediate data generating processor 100 generates intermediate data obtained by decomposing the document data into objects such as images or characters constituting a page of the document data. The intermediate data generating processor 100 stores the generated intermediate data in the intermediate data storing unit 112 of the memory 11.

Next, it is determined whether analysis of the first page of the document data is completed (S32). If it is determined that the analysis of the first page of the document data is not completed yet (S32; No), it is determined whether a preferential preview area used to generate a preview image is specified (S33). If it is determined that the preferential preview area is not specified (S33; No), an analyzing process is performed from the beginning of the document data (S35). If it is determined in S33 that the preferential preview area is specified (S33; Yes), and if it is determined that there is document data corresponding to the specified preferential preview area (S34; Yes), an analyzing process is performed on the document data (S35). If it is determined that there is no document data corresponding to the specified preferential preview area (S34; No), the analyzing process on the document data is skipped (S36). Next, it is determined whether a time spent in analyzing the document data to generate a preview image exceeds a predetermined threshold value (S38). If it is determined that a time spent in analyzing the document data does not exceed the threshold value yet (S38; No), the process returns to step S31, and the intermediate data generating processor 100 continues to perform the process of analyzing the document data.

If it is determined that a time spent in analyzing the document data exceeds the predetermined threshold value (S38; Yes), the process of analyzing the document data is suspended, and the preview image generating processor 101 generates a preview image of only a part on which the analyzing process is completed (S39).

Meanwhile, if it is determined in step S32 that the process of analyzing the first page is completed (S32; Yes), the preview image generating processor 101 generates a preview image of the document data of the first page of the document file (S37). In this case, since the process of analyzing the first page is completed, the preview image obtained through a reduction process for the entire first page is generated.

The preview data management unit 102 displays the generated preview image on the display 12. A user views the preview image displayed on the display 12, and selects a document file to be printed. Here, if it is impossible to select document data to be printed by using the displayed preview image, the user selects and specifies another portion of the page in question, and gives an instruction again to generate a preview image.

That is, it is determined whether to select a preferential preview area (S40). If it is possible to select document data from even a partially generated preview image or if a preview image of the entire first page is generated, it is not necessary to select the preferential preview area. Thus, the process is ended (S40; No).

If it is impossible to select the document file and if it is determined to select a preferential preview area to generate a preview image again (S40; Yes), the user selects an area in the first page the preview image of which is to be generated subsequently, through the operation unit 13 (S41). Next, the process returns to step S31 and is performed again from the process of analyzing data, and newly generates the preview image.

Figure 7A:
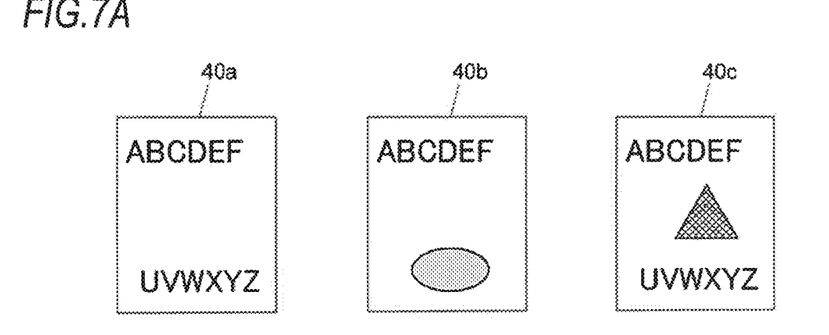
FIG. 7A illustrates document data of first pages of three document files.

FIGS. 7A to 7D illustrate specific examples of the third exemplary embodiment. As illustrated in FIG. 7A, now, it is assumed that there are three document files, that is, a first document file 40a, a second document file 40b, and a third document file 40c. It is also assumed that in a case where document data is sequentially processed from the top to the bottom and termination of the process depends on time as in the second exemplary embodiment described above, the process is terminated after performed only on the upper part of the document data.

Figure 7B:
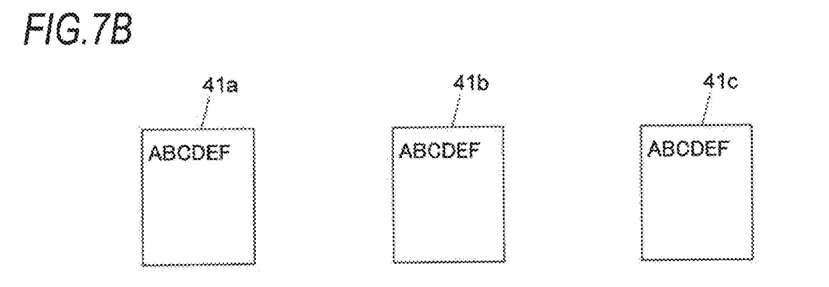
FIGS. 7B to 7D illustrate preview images.
Figure 7C:
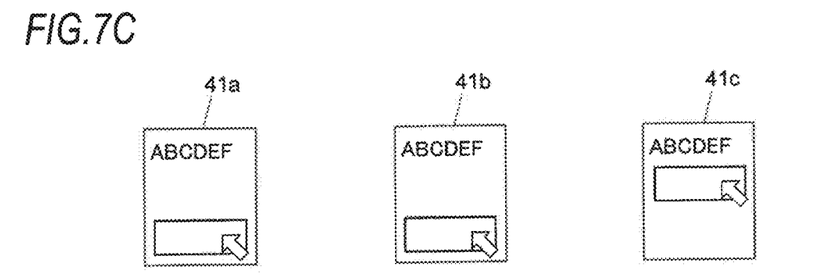

Then, as illustrated in FIG. 7B, preview images of first pages of the first document file 40a, the second document file 40b, and the third document file 40c become a first preview image 41a, a second preview image 41b, and a third preview image 41c, respectively. In all images, only characters A, B, C, D, E, and F in the upper part are displayed.

In this case, a user can not select a document file to be printed. Thus, on each of the preview images 41a, 41b, and 41c, the user selects and specifies a preferential preview area that is an area on which a preview image is to be generated and displayed subsequently, through the operation unit 13. Since the preferential preview area to be specified may be any area, it is assumed that for example, as indicated by the arrows in FIG. 7C, lower parts are specified for the first preview image 41a and the second preview image 41b, and a middle part is specified for the third preview image 41c.

Figure 7D:
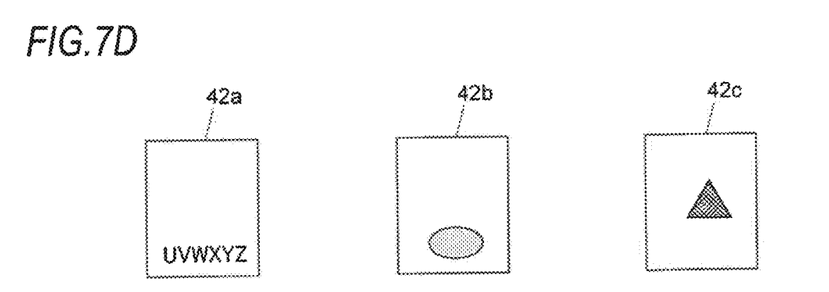

Then, as illustrated in FIG. 7D, in a first preview image 42a, characters U, V, W, X, and Y in the lower part are displayed, in a second preview image 42b, a circle symbol in the lower part is displayed, and in a third preview image 42c, a triangle symbol in the middle part is displayed.

Since the preview images illustrated in FIG. 7D are different from each other, a user can select document data to be printed.

If the user wants to select the first document file 40a and specifies middle parts of all images as preferential preview areas, displays of the first preview image 42a and the second preview image 42b become the same. Thus, the first document file 40a cannot be selected yet. In this case, a preferential preview area is specified again.

As described above, in the third exemplary embodiment, if it is impossible to select document data from a preview image displayed after an analyzing process for generating the preview image is terminated depending on time, a preferential preview area a preview image of which is to be generated is further selected, thereby quickly generating the preview image that facilitates selection of the document data.

Fourth Exemplary Embodiment

In a fourth exemplary embodiment, the condition setting unit 103 sets in advance not only a threshold value of time based on which termination of a process is determined, but also a preferential preview area on which a preview image generating process is performed according to the predetermined priorities on respective specified parts of document data. The preview image generating processor 101 generates a preview image on each preferential preview area according to the priorities, and terminates the process at the preset time. In this manner, in the present exemplary embodiment as well, a reduction process is performed on a part of the document data, thereby speeding up the preview image generating process, and thus quickly displaying the preview image.

In the above described third exemplary embodiment, a process of generating a preview image is terminated based on time, and after a preview image is displayed once, a user selects a preferential preview area. In the fourth exemplary embodiment, a preferential preview area is set in advance and then a process is terminated based on the process time.

The hardware configuration of the image forming apparatus according to the fourth exemplary embodiment is also the same as that of the first exemplary embodiment as described above, and detailed descriptions thereof will be omitted. The threshold value of time based on which termination of a process is determined, and the preferential preview area set by the condition setting unit 103 are stored in the preview image generation information 114.

Figure 8:
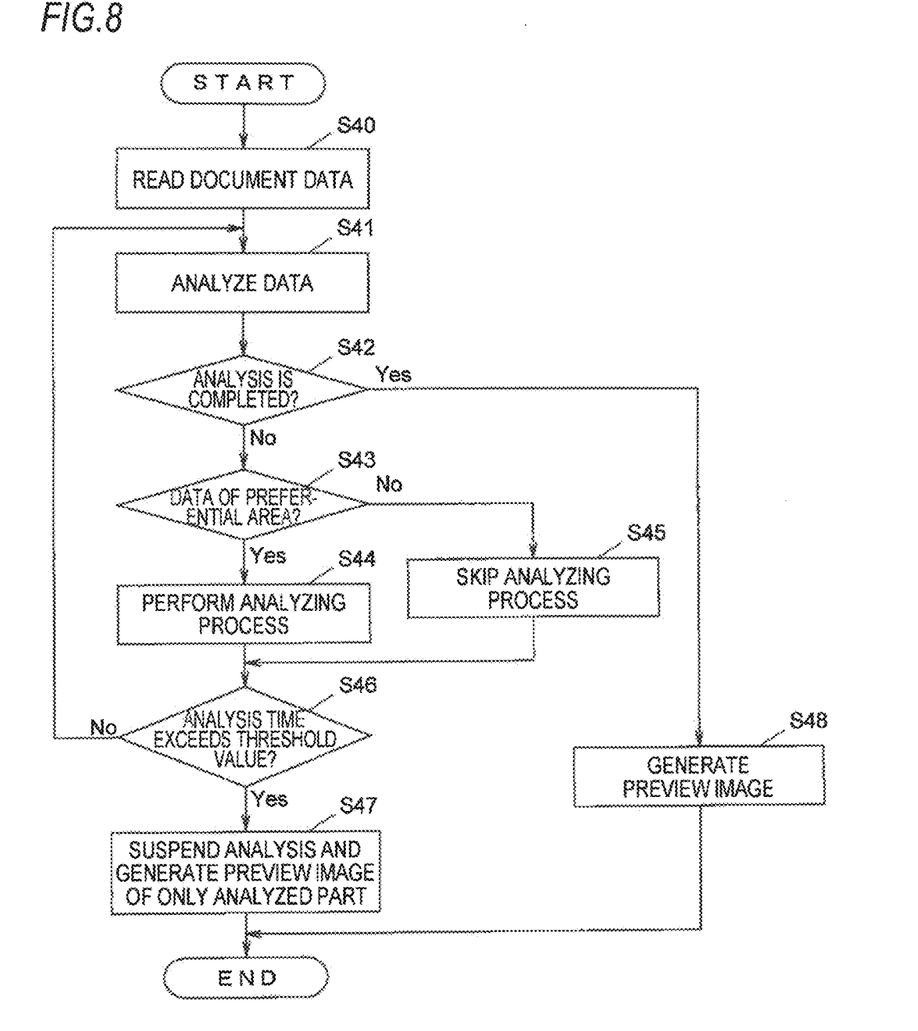
FIG. 8 is a flow chart illustrating an example of an operation according to a fourth exemplary embodiment.

FIG. 8 is a flow chart illustrating an example of an operation according to the fourth exemplary embodiment. Hereinafter, the fourth exemplary embodiment will be described with reference to the flow chart.

In the same manner as in the first exemplary embodiment, when a user gives an instruction to display a preview image on the display 12 by operating the operation unit 13, the controller 10 reads document data of a first page of a document file from the document file storing unit 111 of the memory 11, into a work area of the controller 10 (S40).

The intermediate data generating processor 100 analyzes the read document data (S41). Then, the intermediate data generating processor 100 generates intermediate data obtained by decomposing the document data into objects such as images or characters constituting a page of the document data. The intermediate data generating processor 100 stores the generated intermediate data in the intermediate data storing unit 112 of the memory 11.

Next, it is determined whether analysis of the first page of the document data is completed (S42). If it is determined that the analysis of the first page of the document data is not completed yet (S42; No), it is determined whether data that is currently being processed is data of a preferential preview area set in advance to be preferentially processed (S43).

As a result, if it is determined that the data is not data in the preferential preview area (S43; No), a process of analyzing the data is skipped (S45). If it is determined that the data is data in the preferential preview area (S43; Yes), the intermediate data generating processor 100 performs an analyzing process to generate a preview image of the data (S44).

Next, it is determined whether a time spent in performing the analyzing process exceeds the predetermined threshold value (S46). If it is determined that an analysis time does not exceed the threshold value yet (S46; No), the process returns to step S41, and the intermediate data generating processor 100 continues to perform the analyzing process.

If it is determined that the analysis time exceeds the threshold value (S46; Yes), the analyzing process is suspended, and the preview image generating processor 101 generates a preview image of only a part on which the analyzing process is completed up to that time (S47). Meanwhile, if it is determined in step S42 that the process of analyzing the first page is completed (S42; Yes), the preview image generating processor 101 generates a preview image of the entire first page (S48). The preview data management unit 102 displays the generated preview image on the display 12.

Figure 9A:
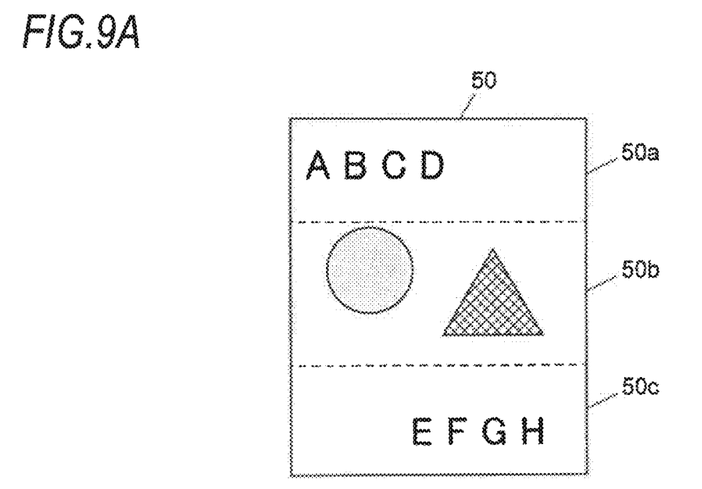
FIG. 9A illustrates document data.
Figure 9B:
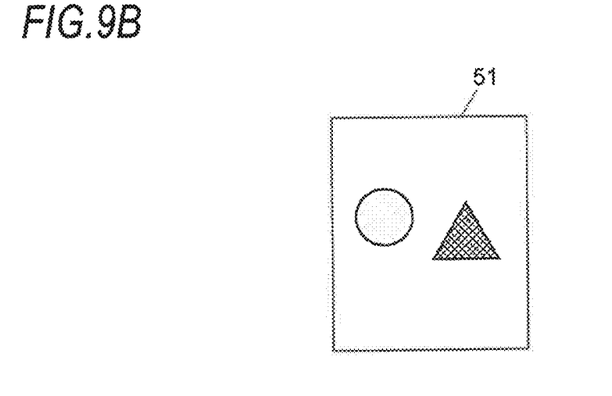
FIG. 9B illustrates a preview image.

FIGS. 9A and 9B illustrate specific examples of the fourth exemplary embodiment. FIG. 9A illustrates document data 50. The document data 50 is divided into three parts of an upper part 50a, a middle part 50b, and a lower part 50c. Processing priorities are set in advance so that the middle part 50b has a first priority, the upper part 50a has a second priority, and the lower part 50c has a third priority.

In this situation, when a process of generating a preview image is initiated, first, an analyzing process for generating the preview image on the middle part 50b having the first priority is performed. Then, if the analysis time exceeds the threshold value, the process is terminated at that time, and the preview image generating processor 101 generates a preview image of a part on which the process is completed up to that time.

FIG. 9B illustrates a preview image 51. If the process on the middle part 50b is completed at least before the analysis time exceeds the threshold value, an image on the middle part 50b of the document data 50 is displayed as the preview image 51.

As described above, in the fourth exemplary embodiment, priorities are set in advance to respective specified parts of document data. A reduction process is performed on each part according to the priorities, and then is terminated after a predetermined time elapses, thereby speeding up the process of generating the preview image.

In the fourth exemplary embodiment, when priorities are set in advance to respective specified parts of document data, the document data is divided into several areas and a priority is set to each area. It should be noted that a method of setting priority is not limited thereto. For example, priorities may be set to respective objects such as images or characters constituting a page of the document data. Alternatively, a preferential preview area may be changed according to the type of a file to be displayed as a preview, such as, a document, an image, or extension.

Also, a method of setting priorities is not particularly limited. For example, a user may specify respective parts of document data through the operation unit 13, and set priorities. Also, priorities may be set by specifying respective parts of the document data in print data by a command such as a page job language (PJL).

After an analyzing process for generating a preview image is suspended at a predetermined time and the preview image is displayed, a user may not perform any operation through the operation unit 13 for another predetermined time. In this case, the suspended preview image generating process may restart so that a preview image may be generated again, and the newly generated preview image may replace the currently displayed preview image.

During generation of a preview image, a user may operate the operation unit 13 to change document data which is a preview target. In this case, for example, if the user flicks an operation panel to change a preview image, the previous preview image generating process may be suspended so that a preview image of the next document data is generated.

Regarding the holding of the generated preview image, only the currently displayed preview image may be held, and old images may be deleted. Alternatively, the number of preview images to be held may be set. Then, if the next preview image is coming in a state where preview images are held up to the upper limit of the set number, the oldest preview images may be overwritten in order.

Although various exemplary embodiments of the present invention have been described above, the present invention is not limited to the above exemplary embodiments, and various modifications may be made without departing from the spirit of the present invention. For example, in the above-described exemplary embodiments, an image forming program is stored in the memory 11 of the image forming apparatus 1, but the image forming program may be stored in a recording medium such as a CD-ROM to be provided.

A part of or all the respective units constituting the controller 10 may be configured with a hardware circuit such as a reconfigurable circuit (e.g., a field programmable gate array (FPGA)), or an application specific integrated circuit (ASIC).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a generating unit that performs a reduction process on at least a part of document data to generate a reduced image; and
a display that displays the reduced image, wherein
if the document data includes a character, the generating unit does not perform the reduction process on the character, but replaces the character with fixed data.

2. The image processing apparatus according to claim 1, wherein
if a size of the character is smaller than a predetermined threshold value, the generating unit does not perform the reduction process on the character, but replaces the character with the fixed data.

3. The image processing apparatus according to claim 1, wherein
the generating unit terminates the reduction process at a preset time, and
the display displays the reduced image that is generated up to a time when the reduction process is terminated.

4. The image processing apparatus according to claim 3, wherein
the generating unit performs the reduction process on respective specified parts of the document data according to predetermined priorities.

5. A non-transitory computer readable storage medium storing a program that causes a computer to function as an image processing apparatus comprising:
a generating unit that performs a reduction process on at least a part of document data to generate a reduced image; and
a display that displays the reduced image, wherein
if the document data includes a character, the generating unit does not perform the reduction process on the character, but replaces the character with fixed data.

6. The non-transitory computer readable storage medium according to claim 5, wherein
if a size of the character is smaller than a predetermined threshold value, the generating unit does not perform the reduction process on the character, but replaces the character with the fixed data.

7. The non-transitory computer readable storage medium according to claim 5, wherein
the generating unit terminates the reduction process at a preset time, and
the display displays the reduced image that is generated until when the reduction process is terminated.

8. The non-transitory computer readable storage medium according to claim 7, wherein
the generating unit performs the reduction process on respective specified parts of the document data according to predetermined priorities.

9. An image processing method comprising:
performing a reduction process on at least a part of document data to generate a reduced image; and
displaying the reduced image, wherein
if the document data includes a character, the reduction process is not performed on the character, but the character is replaced with fixed data.

* * * * *